Figure 1:
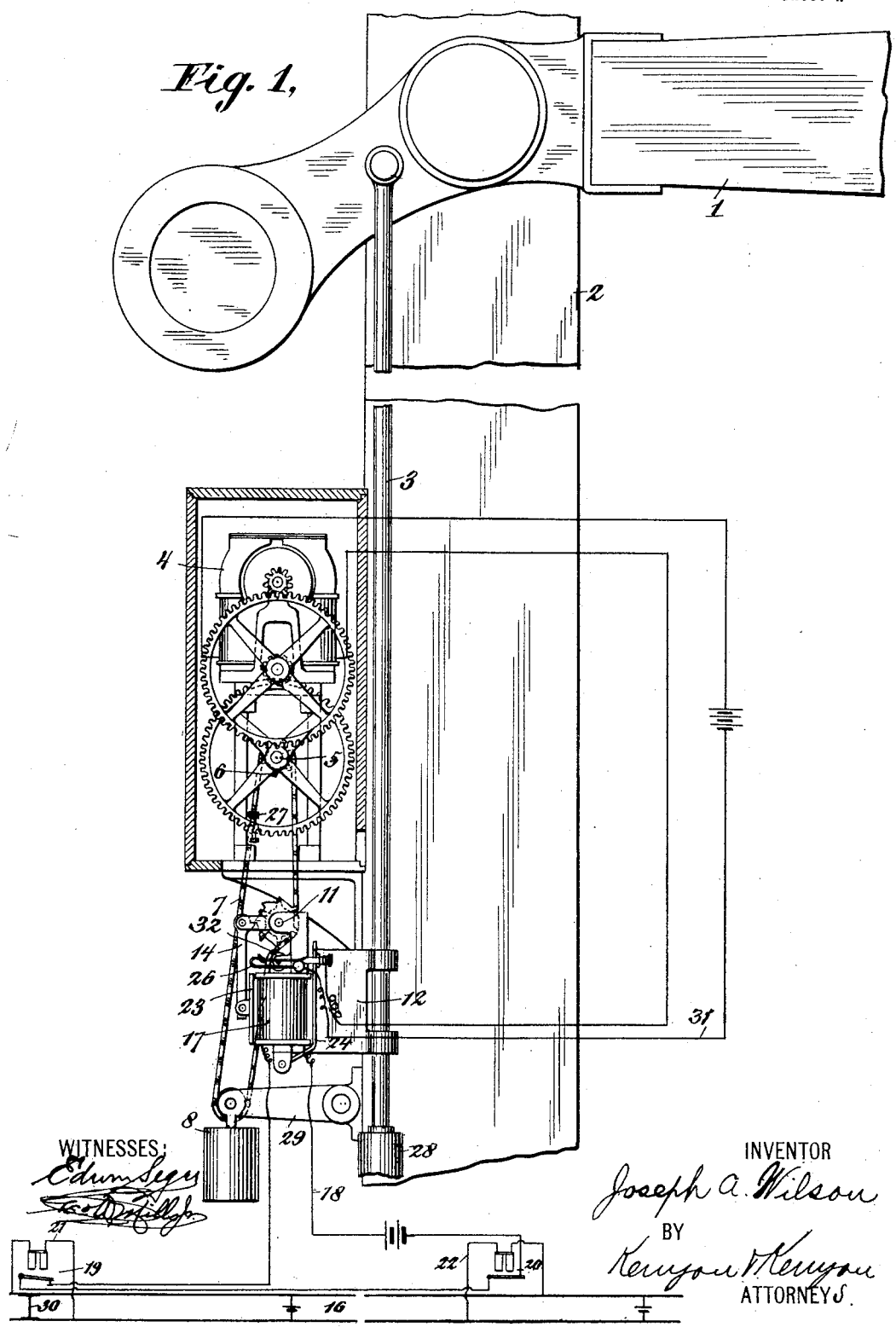

No. 684,968. Patented Oct. 22, 1901.
J. A. WILSON.
SIGNAL.
(Application filed Sept. 23, 1899.)
(No Model.) 2 Sheets—Sheet 1.

WITNESSES:

INVENTOR
Joseph A. Wilson
BY
Kenyon & Kenyon
ATTORNEYS.

No. 684,968. Patented Oct. 22, 1901.
J. A. WILSON.
SIGNAL.
(Application filed Sept. 23, 1899.)
(No Model.) 2 Sheets—Sheet 2.
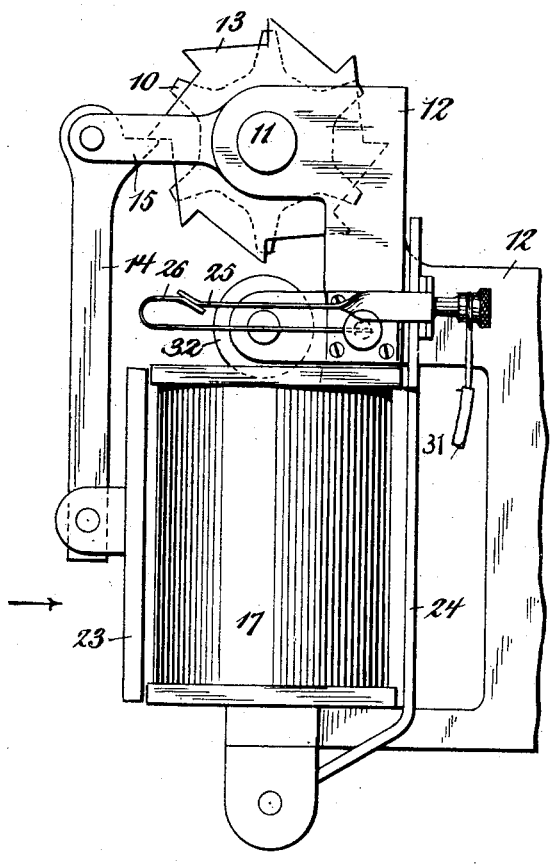
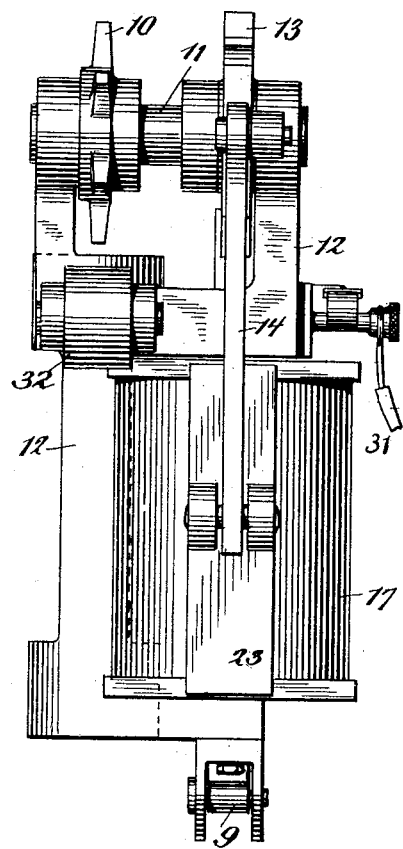

UNITED STATES PATENT OFFICE.

JOSEPH A. WILSON, OF CHICAGO, ILLINOIS, ASSIGNOR TO THE HALL SIGNAL COMPANY, A CORPORATION OF MAINE.

SIGNAL.

SPECIFICATION forming part of Letters Patent No. 684,968, dated October 22, 1901.

Application filed September 23, 1899. Serial No. 731,468. (No model.)

*To all whom it may concern:*

Be it known that I, JOSEPH A. WILSON, a citizen of the United States, and a resident of Chicago, in the county of Cook and State of Illinois, have invented a new and useful Improvement in Signals, of which the following is a specification.

This invention relates primarily to signals, and more particularly to railway-signals, and to such as are automatic in their operation.

The invention resides in the means and in the arrangement thereof for operating and controlling the movement of the semaphore of the signal. This semaphore may be of any desired variety. I contemplate especially, however, the employment of a semaphore-blade, such as is generally used in exposed-position signals.

In the accompanying drawings, forming part of this specification, and in which like numerals of reference designate corresponding parts, I have shown one embodiment of the invention.

Figure 1 is a side elevation of the signal, showing the connected circuits, some of the parts being broken away and the motor-box in section. Fig. 2 is a side elevation of a special clutch device, and Fig. 3 is an elevation of the clutch device looking in the direction of the arrow in Fig. 2.

Referring now to the particular construction and arrangement shown in the drawings, 1 is a semaphore-blade pivoted on the post 2 and biased by a counterweight to stand normally in danger position, as shown.

3 is an actuating-rod connected to the semaphore and adapted when moved upward to shift the semaphore to "safety." The electric motor 4 is suitably geared, so as to turn the shaft 5, on which is fixed the drive-wheel 6 for driving the belt 7, which, as shown, is preferably a sprocket-chain.

8 is a tension-weight hung on an arm 29, pivoted on the post 2 and carrying a pulley 9, over which the chain runs. The weight serves to keep the belt taut. The rod 3 carries a clutch adapted to unite and disunite rod 3, and therefore the semaphore with the belt at any point thereof, and when the clutch has thus united the semaphore and belt and the belt is driven the rod 3 will be lifted and the semaphore lowered. In its preferred form the clutch comprises a sprocket or toothed wheel, whose teeth enter the links of the chain 7, and a catch to lock the sprocket-wheel.

10 is the sprocket-wheel. It is fixed on the shaft 11, carried by the bracket 12, secured to the rod 3. Fixed on the shaft 11 is a toothed wheel 13. Suspended from the bracket 12 is a catch 14, having a toe 15, adapted to be moved into and out of the path of the toothed wheel 13, so as to lock and release the wheel, and thereby lock and release the wheel 10, so as to clutch and unclutch the chain 7. It will thus be seen that the clutch is normally in loose engagement with the chain. The motor and the clutch are both preferably controlled electrically and by a train on the track 16. To this end a magnet 17 is fixed on the bracket 12 and connected in the circuit 18. This circuit has two pairs of contacts 19 and 20. Located, respectively, at the rear and in advance of the signal, as shown, are rail-circuits 21 and 22 to control the circuit 18. The magnet 17 has an armature 23, carried on the lower end of the catch 14, which when drawn toward the magnet moves the catch so that the toe 15 locks the wheel 13 and so clutches the chain 7. When the magnet is deënergized and the armature is released, the catch swings back from the magnet and the toe 15 moves out of the path of the wheel, so as to unclutch the chain.

24 is another armature, pivoted at its lower end on the bracket 12 and carrying at its upper end a contact-plate 25, adapted to move into and out of contact with the contact-plate 26, fixed on the bracket 12. When the magnet 17 is deënergized, the armature 24 moves from the magnet and separates the contacts 25 and 26. These contacts 25 and 26 are in the circuit 31 of the motor 4. When the magnet 17 is energized, it will thus be seen that the chain is engaged by the clutch and the motor is started to lower the semaphore. 27 is an adjustable abutment mounted in the path of the contact 26. As the latter rises with the rod 3 it strikes the abutment 27 and breaks the motor-circuit and arrests the semaphore. When the magnet 17 is deënergized, the clutch releases the chain, permitting the semaphore to rise and causing the sprocket-wheel 10 to run down freely on the chain and independent of any movement of the chain or the motor, both of which are at rest. The dash-pot 28 prevents undue jarring of the parts when the semaphore rises.

32 is a guide-roller on the bracket 12, over which the chain 7 runs.

The operation of the signal is as follows: The signal being in its normal danger position, as shown in Fig. 1, and a train (indicated at 30) approaching the signal from left to right operates the rail-circuit 21 in the usual way and closes the normally open contacts 19 in the circuit 18, thereby energizing the magnet 17, which attracts the armatures 23 and 24. The movement of the armature 23 throws the toe of the latch 14 in the path of the wheel 13, thus locking fast together the clutch and the chain, and thereby uniting the semaphore and chain. The movement of the armature 24 closes the normally open contacts 25 and 26 in the motor-circuit 31, thus energizing the motor. As the motor drives the belt 7 the sprocket-wheel 10, being fast in the belt, is bodily lifted, carrying with it the bracket 12, on which is mounted the magnet 17, and lifting the rod 3, on which the bracket 12 is fixed. The signal is thereby lowered to "safety." As the bracket 12 rises the contact 26 strikes the stop 27, opening the circuit 31 and stopping the motor. The signal remains at "safety" until the train has passed to the following rail-section in advance of the signal, thereby operating the rail-circuit 22 and opening the contacts 20 in the circuit 18 and deënergizing the magnet 17. As the train passes from the rail-circuit 21 the contacts 19 assume their normal open position. When the magnet 17 is deënergized by the breaking of the circuit 18, the armatures 23 and 24 move from the magnet, the latter separating the contacts 25 and 26 and leaving the motor-circuit in its normal open position. The movement of the armature 23 from the magnet releases the wheel 13, so that the sprocket-wheel 10 is free to rotate, and the semaphore 1 rises to its normal position by virtue of its counterweight, carrying the rod 3 downward, and with it the bracket 12 and the devices carried thereby, the sprocket-wheel rotating as it runs down the belt 7. As the train leaves the rail-circuit 21 the contacts 20 are closed, and the signal and the circuits are then all in normal condition.

While I prefer to employ the concrete embodiment of the invention as shown in the accompanying drawings in most cases, it is to be understood that various changes in the construction and arrangement of the signal may be made without departing from the invention and that various features of the signal shown in the drawings may be omitted or replaced by others and still retain certain advantages of the invention. For example, the signal might be operated or controlled, or both, by other means than electrical, as mechanical, pneumatic, hydraulic, or various combinations of such means. In some cases the signal might be worked by hand instead of automatically by the train, as herein shown and described. Again, the semaphore may be of any of the various types of semaphores, such as revolving or other motion signals or disk signals. Moreover, some of the advantages of the invention may be attained with the semaphore arranged to stand normally at "safety." These various forms of signals or semaphores are included within the term "semaphore" as herein employed. If desired, the semaphore may be inclosed.

What I claim as new, and desire to secure by Letters Patent, is—

1. In a signal, the combination of a movable semaphore; an operating-belt therefor; a motor for driving the belt in one direction; a clutch connected to move with the semaphore and normally in loose engagement with the belt; means for uniting the clutch and belt together, whereby when the clutch is united with the belt the latter may be driven to operate the semaphore.

2. In a signal, the combination of a movable semaphore, an operating-belt therefor, a motor for driving the belt in one direction, a clutch connected to move with the semaphore and normally in loose engagement with the belt and means for uniting and disuniting the clutch and belt, whereby when the clutch is united with the belt the latter may be driven to operate the semaphore, and when the clutch is disunited from the belt it may return with the semaphore to its starting position independently of the belt.

3. In a railway-signal, the combination of a semaphore biased to stand normally at "danger;" an operating-belt for the semaphore; a clutch connected to move with the semaphore and adapted to unite and disunite the semaphore and belt; a motor for driving the belt to shift the semaphore from danger to safety position; means controlled by a train in the rear of the signal for operating the clutch to unite the semaphore and belt and for driving the motor to shift the signal to "safety;" and means controlled by a train in advance of the signal for releasing the clutch to permit the clutch and semaphore to return to normal position.

4. In a railway-signal, the combination of a semaphore biased to stand normally at "danger;" an operating-belt for the semaphore; a clutch connected to move with the semaphore and adapted to unite and disunite the semaphore and belt; an electric motor for driving the belt to shift the semaphore from danger to safety position; electric means controlled by a train in the rear of the signal for operating the clutch to unite the semaphore and belt and for driving the motor to shift the signal to "safety;" and electric means controlled by a train in advance of the signal for releasing the clutch to permit the clutch and semaphore to return to normal position.

5. In a railway-signal, the combination of a signal-operating rod; a power-driven belt; and a clutching device connected to move with said rod for clutching and releasing said belt, whereby when the belt is driven and is held by the clutch the signal may be operated, said clutching device including a wheel in proximity to the belt and means for locking the wheel and belt together.

6. In a railway-signal, the combination of a signal-operating rod; a power-driven belt; and a clutching device connected to and moving with said rod for clutching and releasing said belt, whereby when the belt is driven and is held by the clutch the signal may be operated, said clutching device including a wheel in proximity to the belt and electrically-controlled means for locking the wheel and belt together.

7. In a railway-signal, the combination of a signal-operating rod; a power-driven belt; and a clutching device on said rod for clutching and releasing said belt, whereby when the belt is driven and is held by the clutch the signal may be operated, said clutching device including a wheel in proximity to the belt and means for locking the wheel and belt together.

8. In a railway-signal, the combination of a semaphore; an electric motor; a belt driven thereby for operating the semaphore; a clutch arranged to move with the actuating-rod of the semaphore for uniting and disuniting the semaphore and belt; contact-points in the circuit of the motor carried on said rod; magnetic means carried on said rod for controlling said clutch and said contact-points; and circuits controlled by a train for influencing said magnetic means.

9. In a railway-signal, the combination of a semaphore biased to assume a predetermined position; a motor; a sprocket-chain driven in one direction by the motor; a clutch arranged to move with the semaphore and to unite the semaphore and chain and comprising a sprocket-wheel meshing with the chain and a device to lock and unlock said sprocket-wheel whereby when the chain is united with the semaphore the motor may move the semaphore from one position to another.

10. In a railway-signal, the combination of a semaphore biased to assume a predetermined position; a motor; a sprocket-chain driven in one direction by the motor; a clutch arranged to move with the semaphore and to unite the semaphore and chain and comprising a sprocket-wheel meshing with the chain and a device to lock and unlock the said sprocket-wheel whereby when the chain is united with the semaphore the motor may move the semaphore from one position to another, and means for automatically throwing out the motor when the semaphore has made a predetermined movement.

11. In a railway-signal, the combination of a semaphore biased to assume a predetermined position; an electric motor; a sprocket-chain driven in one direction by the motor; and a clutch on the actuating-rod of the semaphore and arranged to be united with and disunited from said chain, said clutch comprising a normally free sprocket-wheel meshing with the chain and a device to lock and unlock said sprocket-wheel whereby when the sprocket-wheel is locked the movement of the chain may shift the semaphore.

12. In a signal, the combination of a movable semaphore; an operating-belt therefor; a motor for driving the belt; a clutch connected to move with the semaphore and arranged to be united with and disunited from said belt, whereby the belt, when united with the clutch, may operate the semaphore, said clutch including a wheel in proximity to the belt and means for locking the wheel and belt together; and means for automatically throwing out the motor when the semaphore has made a predetermined movement.

13. In a signal, the combination of a movable semaphore; an operating-belt therefor; a motor for driving the belt in one direction; a clutch connected to move with the semaphore and adapted to be united with and disunited from said belt at various points, whereby when the clutch is united with the belt, the latter may be driven to operate the signal, and when the clutch has been disunited from the belt it may return with the semaphore to its starting position independently of the belt, said clutch including a wheel in proximity to the belt and means for locking the wheel and belt together, and means for automatically throwing out the motor when the semaphore has made a predetermined movement.

14. In a railway-signal, the combination of a semaphore; an electric motor; a belt driven thereby for operating the semaphore; a clutch carried on the actuating-rod of the semaphore for uniting and disuniting said rod and belt; contact-points in the circuit of the motor carried on said rod; magnetic means carried on said rod for controlling said clutch and contact-points; circuits controlled by a train for influencing said magnetic means; and means for automatically breaking the circuit of the motor when the semaphore has made a predetermined movement.

15. In a railway-signal, the combination of a semaphore biased to stand normally at "danger;" a clutch carried with the semaphore; a belt adapted to be united with and disunited from the semaphore by the clutch; a motor for driving the belt to shift the semaphore from danger to safety position; means controlled by a train in the rear of the signal for operating the clutch to unite the semaphore and the belt and for driving the motor to shift the signal to "safety;" means controlled by a train in advance of the signal for releasing the clutch to permit the clutch and semaphore to return to normal position; and means for automatically breaking the circuit of the motor when the semaphore has made a predetermined movement.

16. In a railway-signal, the combination of a semaphore biased to stand normally at "danger;" a clutch carried with the semaphore; a belt adapted to be united with and disunited from the semaphore by the clutch; an electric motor for driving the belt to shift the semaphore from danger to safety position; electric means controlled by a train in the rear of the signal for operating the clutch to unite the semaphore with the belt and for driving the motor to shift the signal to "safety;" electric means controlled by a train in advance of the signal for releasing the clutch to permit the clutch and semaphore to return to normal position, and means for automatically breaking the circuit of the motor when the semaphore has moved from "danger" to "safety."

In testimony whereof I have signed my name to this specification in the presence of two subscribing witnesses.

JOSEPH A. WILSON.

Witnesses:
A. J. WILSON,
M. W. TRACY.